United States Patent
Hommura et al.

(10) Patent No.: US 7,462,575 B2
(45) Date of Patent: Dec. 9, 2008

(54) CATALYST POWDER, CATALYST ELECTRODE, AND ELECTROCHEMICAL DEVICE

(75) Inventors: Hayato Hommura, Kanagawa (JP); Kenji Katori, Kanagawa (JP)

(73) Assignee: Sony Corporation, Tokyo (JP)

( * ) Notice: Subject to any disclaimer, the term of this patent is extended or adjusted under 35 U.S.C. 154(b) by 652 days.

(21) Appl. No.: 10/819,871

(22) Filed: Apr. 7, 2004

(65) Prior Publication Data
US 2004/0265678 A1 Dec. 30, 2004

(30) Foreign Application Priority Data
Apr. 8, 2003 (JP) ............... 2003-103687

(51) Int. Cl.
B01J 21/18 (2006.01)
B01J 23/40 (2006.01)
B01J 23/74 (2006.01)
H01M 4/00 (2006.01)
H01M 4/88 (2006.01)

(52) U.S. Cl. ............ 502/185; 502/101; 429/40; 429/41; 429/42; 429/43; 429/44

(58) Field of Classification Search ............ 502/101, 502/185; 429/40–44
See application file for complete search history.

(56) References Cited

U.S. PATENT DOCUMENTS

| | | | |
|---|---|---|---|
| 5,879,827 A * | 3/1999 | Debe et al. ............ 429/40 |
| 5,882,810 A | 3/1999 | Mussell et al. |
| 6,103,077 A * | 8/2000 | DeMarinis et al. ..... 204/290.07 |
| 6,165,636 A | 12/2000 | Giallombardo et al. |
| 6,232,264 B1 | 5/2001 | Lukehart et al. |
| 6,239,065 B1 | 5/2001 | Schulz et al. |
| 6,379,834 B1 | 4/2002 | Giallombardo et al. |
| 6,602,630 B1 * | 8/2003 | Gopal ............ 429/30 |
| 6,946,211 B1 * | 9/2005 | Bjerrum et al. ........ 429/33 |
| 7,022,642 B2 * | 4/2006 | Yamamoto ............ 502/185 |

(Continued)

FOREIGN PATENT DOCUMENTS

EP 0 878 860 12/1998

(Continued)

Primary Examiner—Jerry Lorengo
Assistant Examiner—Patricia L Hailey
(74) Attorney, Agent, or Firm—Robert J. Depke; Rockey, Depke & Lyons, LLC.

(57) ABSTRACT

Disclosed is a catalyst powder contained in an electrode, wherein the catalyst powder includes a catalytic substance supported on a conductive powder, the catalytic substance being comprised of at least a catalyst, the weight ratio of the catalytic substance to the catalyst powder is in the range of 55 to 75 wt %, and the areal density of the catalytic substance is in the range of 1 to 3 mg/cm². Also disclosed is a catalyst electrode including a catalyst powder and a solid polymer electrolyte, the catalyst powder including a catalytic substance supported on a conductive powder, the catalytic substance being comprised of at least a catalyst, wherein the weight ratio of the catalytic substance to the catalyst powder is in the range of 55 to 75 wt %, and the areal density of the catalytic substance in the catalyst powder is in the range of 1 to 3 mg/cm². Further disclosed is an electrochemical device including a plurality of electrodes, and an ionic conductor sandwiched between the electrodes, wherein the above-mentioned catalyst electrode constitutes at least one of the plurality of electrodes.

5 Claims, 10 Drawing Sheets

U.S. PATENT DOCUMENTS

| | | | |
|---|---|---|---|
| 7,220,514 B2 * | 5/2007 | Yasumoto et al. | 429/42 |
| 2002/0019308 A1 | 2/2002 | Hitomi | |
| 2002/0132154 A1 | 9/2002 | Adzic | |
| 2004/0265665 A1 | 12/2004 | Yan | |

FOREIGN PATENT DOCUMENTS

| | | |
|---|---|---|
| JP | 05-036418 | 2/1993 |
| JP | 08-117598 | 5/1996 |
| JP | 08-162123 | 6/1996 |
| JP | 10-069914 | 3/1998 |
| JP | 11-144751 | 5/1999 |
| JP | 11-315390 | 11/1999 |
| JP | 2002-083605 | 3/2002 |
| JP | 2002-511639 | 4/2002 |
| JP | 2002-532247 | 10/2002 |
| JP | 2003-036860 | 2/2003 |
| WO | WO 01/18894 | 3/2001 |

* cited by examiner

F I G. 2
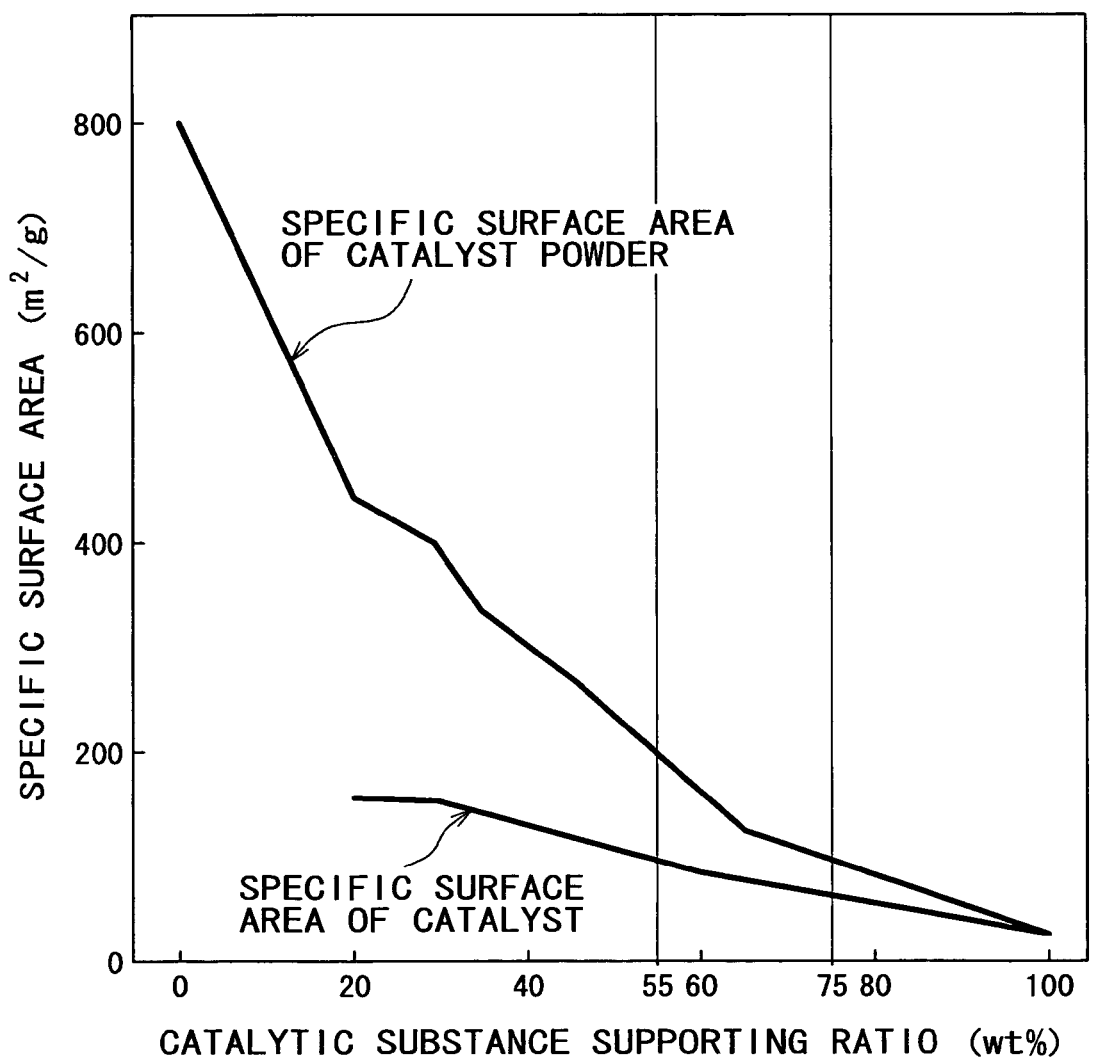

F I G. 4
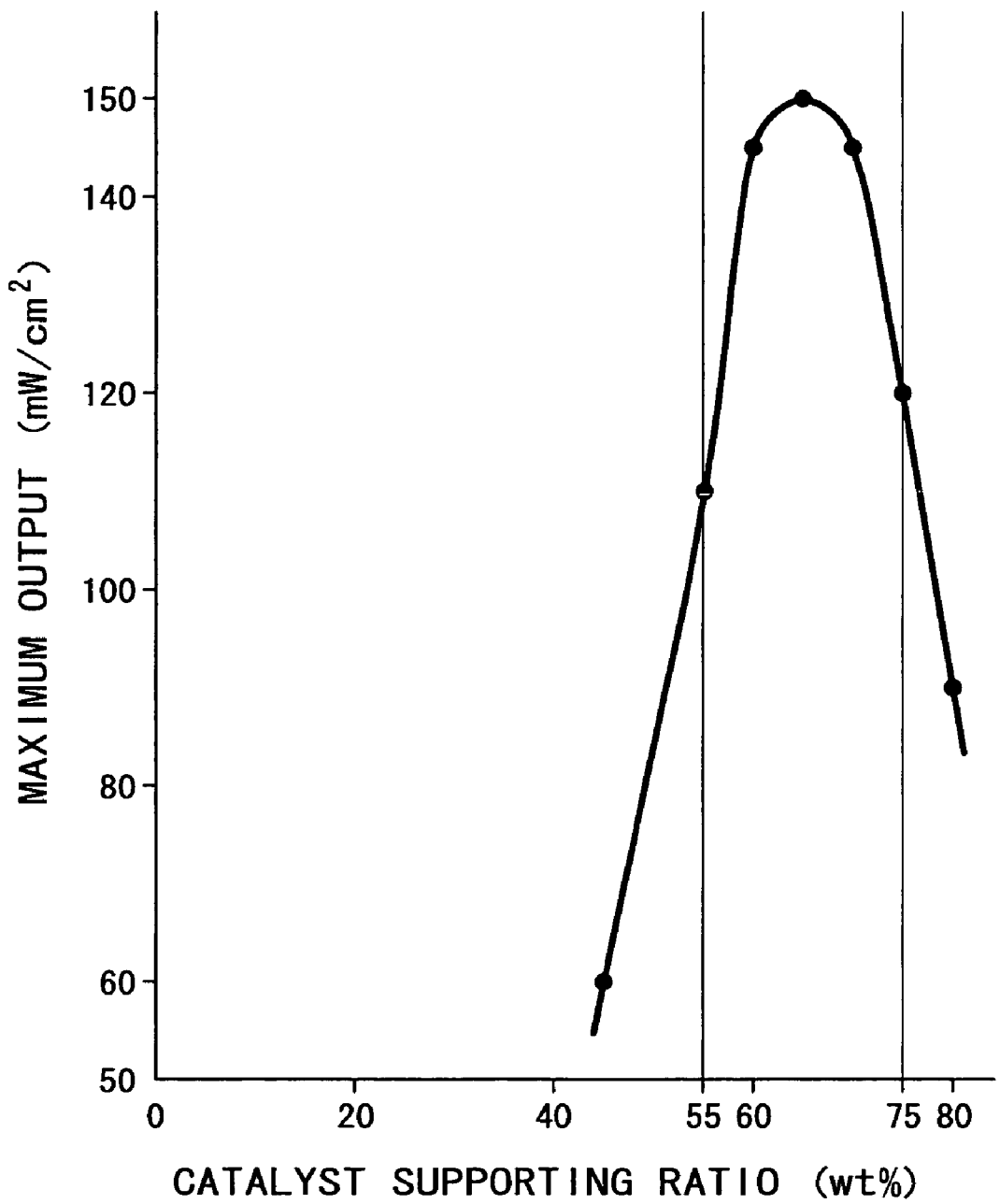

CATALYST POWDER, CATALYST ELECTRODE, AND ELECTROCHEMICAL DEVICE

BACKGROUND OF THE INVENTION

The present invention relates to a catalyst powder, a catalyst electrode, and an electrochemical device.

Solid polymer electrolyte type fuel cells can have a higher energy density as compared with other types of fuel cells, and are considered to be easy to reduce in size; therefore, solid polymer electrolyte type fuel cells are very highly expected to be applied to portable uses. Accordingly, the solid polymer electrolyte type fuel cells constitute a field in which developments have recently been vigorously carried out in the world and to which much attention has been being paid.

The cell structure of a solid polymer electrolyte type fuel cell is a laminate structure of cathode current collector/cathode (oxygen electrode) side catalyst layer/solid polymer type electrolyte/anode (fuel electrode) side catalyst layer/anode current collector, and a variety of researches have been carried out as to the materials of the components thereof, the manufacturing methods thereof, the methods for forming the cell structures thereof, and the like (see, for example, Japanese Patent Laid-open No. Hei 5-36418 (page 2, right lower column, line 42 to page 3, column 3, line 9)).

In addition, the solid polymer electrolyte type fuel cell is supplied with oxygen on the cathode side and with a fuel such as hydrogen and an alcohol on the anode side, to thereby generate electric power.

The catalyst layer on the cathode or anode side is comprised of a solid polymer electrolyte, and a catalyst powder including particles of a catalyst such as platinum supported on a carbon powder, and it is considered that an optimum ratio of the catalyst particles is in the range of 20 to 55 wt % (see, for example, Japanese Patent Laid-open No. Hei 8-117598 (page 3, column 3, lines 12 to 22). The optimum ratio has been considered to be in the above-mentioned range, taking into account the effective utilization efficiency of the catalyst particles such as platinum particles in view of the amount used, the particle diameter, and the specific surface are of the catalyst particles.

However, in order to enlarge the areal density of the catalyst particles in the catalyst layer for the purpose of increasing the output current, there has been no other way than enlarging the thickness of the catalyst layer. Where a catalyst powder with a catalyst particle supporting ratio of 20 to 55 wt % as above-mentioned is used, an increase in the thickness of the catalyst layer leads to an increase in the amount of a binder needed, because the specific surface area of the catalyst particles is enlarged, and results in an increase of the electronic resistance in the electrode. Besides, forming a thicker catalyst layer involves such problems as cracking of the layer, resulting in that the stability of the catalyst layer is lowered.

On the other hand, where a catalyst powder with a high catalyst particle supporting ratio is used, the specific surface area of the catalyst particles is small, so that a sufficient reaction area cannot be obtained, and good output characteristics cannot be developed.

SUMMARY OF THE INVENTION

It is an object of the present invention to provide a catalyst powder and a catalyst electrode by which output characteristics can be enhanced, and an electrochemical device using them.

In accordance with one aspect of the present invention, there is provided a catalyst powder contained in an electrode, wherein the catalyst powder includes a catalytic substance supported on a conductive powder, the catalytic substance being comprised of at least a catalyst, the weight ratio of the catalyst substance to the catalyst powder (catalytic substance supporting ratio) is in the range of 55 to 75 wt %, and the areal density of the catalytic substance is in the range of 1 to 3 $mg/cm^2$.

In accordance with another aspect of the present invention, there is provided a catalyst electrode including a catalyst powder and a solid polymer electrolyte, the catalyst powder including a catalytic substance supported on a conductive powder, the catalytic substance being comprised of at least a catalyst, wherein the weight ratio of the catalytic substance to the catalyst powder is in the range of 55 to 75 wt %, and the areal density of the catalytic substance in the catalyst powder is in the range of 1 to 3 $mg/cm^2$.

In accordance with a further aspect of the present invention, there is provided an electrochemical device including a plurality of electrodes, and an ionic conductor sandwiched between the electrodes, wherein the above-mentioned catalyst electrode according to the present invention constitutes at least one of the plurality of electrodes.

Here, the above-mentioned term "areal density" means the weight of the catalytic substance per unit area of the electrode.

According to the present invention, the weight ratio of the catalytic substance is specified to be in the range of 55 to 75 wt %, and the areal density of the catalytic substance is specified to be in the range of 1 to 3 $mg/cm^2$, so that it is possible to enlarge effectively and easily the effective reaction area of the catalyst in the electrode, and to enhance output characteristics.

In addition, by simultaneously satisfying both the condition as to the weight ratio of the catalytic substance and the condition as to the areal density of the catalytic substance, it is possible to enlarge the areal density of the catalyst without, for example, enlarging the thickness of the catalyst layer as in the related art. This is because the specific surface area of the catalyst powder according to the present invention is smaller than that in the related art, and this also makes it possible to reduce the amount of the solid polymer electrolyte, which functions also as a binder. Therefore, it is possible to lower the internal resistance of the electrode, and to restrain the voltage drop arising from the internal resistance, so that it is possible to increase the output of the electrochemical device.

Furthermore, since the weight ratio of the catalytic substance is specified to be in the above-mentioned range according to the present invention, the specific surface area of the catalyst powder is smaller than that of a catalyst powder according to the related art. Therefore, for example, at the time dispersing the catalyst powder according to the present invention in a solvent to prepare a coating material for forming a catalyst layer as in the related art, it is possible to reduce the amount of the solvent used, and to lower the burden to the environment.

BRIEF DESCRIPTION OF THE DRAWINGS

The above and other objects, features and advantages of the present invention will become apparent from the following description and appended claims, taken in conjunction with the accompanying drawings, in which:

FIG. 2 is a graph showing the relationship between catalytic substance supporting ratio and the specific surface area of a catalyst powder or a catalyst;

FIG. 4 is a graph showing the relationship between catalyst supporting ratio and maximum output, according to an embodiment of the present invention;

DESCRIPTION OF THE PREFERRED EMBODIMENTS

Figure 1:
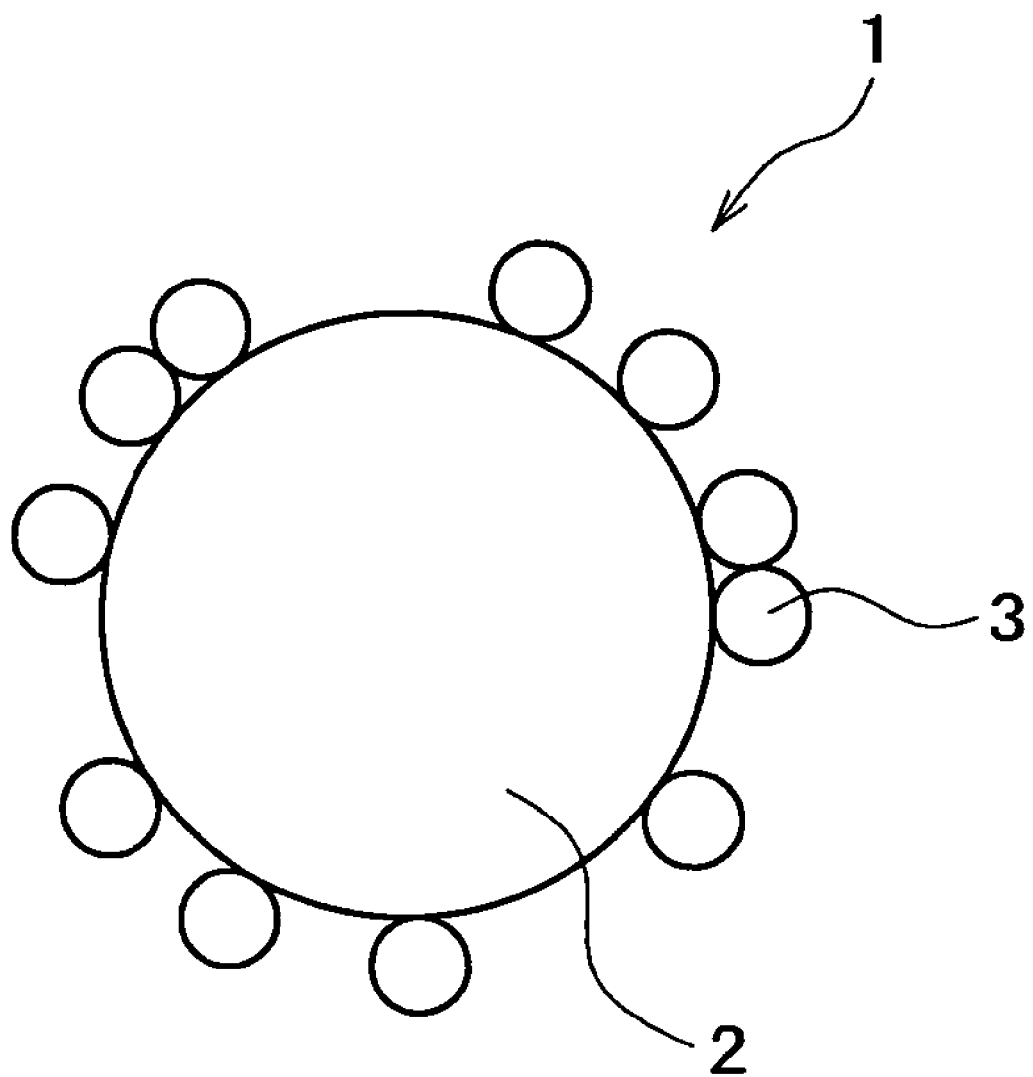
FIG. 1 is a schematic sectional view of a catalyst powder based on the present invention, according to an embodiment of the present invention.

FIG. 1 is a schematic sectional view of a catalyst powder based on the present invention.

As shown in FIG. 1, the catalyst powder 1 based on the present invention includes a catalyst 3 as the catalytic substance supported on the surfaces of a conductive powder 2, wherein the weight ratio of the catalyst 3 to the catalyst powder 1 is in the range of 55 to 75 wt %, preferably 57 to 75 wt %, more preferably 60 to 70 wt %, and the areal density of the catalyst 3 is in the range of 1 to 3 $mg/cm^2$.

Here, the catalytic substance may be constituted of the catalyst 3 only, or may be constituted of the catalyst 3 and other substance(s) such as silicon and silicon oxide (this applies here and hereinafter).

The catalyst powder 1 based on the present invention can be used favorably for a catalyst electrode in an electrochemical device.

Namely, a catalyst electrode based on the present invention includes the above-described catalyst powder based on the present invention and a solid polymer electrolyte, wherein the weight ratio of the catalytic substance to the catalyst powder is in the range of 55 to 75 wt % (preferably 57 to 75 wt %, more preferably 60 to 70 wt %), and the areal density of the catalytic substance in the catalyst powder is in the range of 1 to 3 $mg/cm^2$.

Specifically, it is preferable that a catalyst layer including the catalyst powder based on the present invention and the solid polymer electrolyte is formed, and the catalyst layer is held on a current collector such as a carbon sheet. The thickness of the catalyst layer may be, for example, 5 to 50 µm.

Here, in order to enlarge the areal density of the catalyst particles for the purpose of enhancing the output current, it is necessary to enlarge the thickness of the catalyst layer. However, as shown in FIG. 2, when the weight ratio of the catalytic substance is less than 55 wt %, the specific surface area of the catalyst powder increases as the catalytic substance supporting ratio decreases, since the amount of the catalytic substance is small. Therefore, the amount of the solid polymer electrolyte (binder) needed is increased, so that, when the thickness of the catalyst layer is enlarged, the electronic resistance in the electrode is increased, and the output characteristic is lowered. In addition, when the catalyst layer is formed in a thick form, such problems as cracking of the layer are generated, resulting in that the stability of the catalyst layer is lowered.

On the other hand, when the weight ratio of the catalytic substance exceeds 75 wt %, as shown in FIG. 2, the specific surface area of the catalyst becomes smaller, so that a sufficient reaction area cannot be obtained, and the output characteristic is lowered. Though the use of a large amount of the catalyst makes it possible to enlarge the reaction area, a marked increase in the amount of the catalyst used is disadvantageous on a cost basis.

Further, when the areal density of the catalytic substance is less than 1 $mg/cm^2$, an effective reaction area cannot be obtained, and good output characteristics cannot be obtained. On the other hand, when the areal density of the catalytic substance exceeds 3 $mg/cm^2$, the excessively large areal density leads to an increase in the thickness of the catalyst layer, thereby increasing the electronic resistance in the electrode and lowering the output characteristic. Besides, the formation of the catalyst layer in a thick form leads to such problems as easier cracking of the layer, thereby lowering the stability of the catalyst layer.

Therefore, by simultaneously specifying both the weight ratio of the catalytic substance and the areal density of the catalytic substance in the above-mentioned respective ranges, it is possible to enlarge effectively and easily the effective reaction area of the catalyst in the electrode and to enhance the output characteristic.

In addition, with the two conditions as to the weight ratio of the catalytic substance and the areal density of the catalytic substance fulfilled, it is possible to enlarge the areal density of the catalyst without, for example, enlarging the thickness of the catalyst layer. Therefore, the specific surface area of the catalyst powder based on the present invention is smaller, as compared with that in the related art, and it is possible to reduce the amount of the solid polymer electrolyte, which functions also as a binder. Accordingly, it is possible to reduce the internal resistance of the electrode, and to restrain the voltage drop arising from the internal resistance, so that it is possible to increase the output of the electrochemical device.

Furthermore, since the weight ratio of the catalytic substance is specified in the above-mentioned range, the specific surface area of the catalyst powder is smaller than that in the related art. Therefore, when the catalyst powder based on the present invention is, for example, dispersed in a solvent to prepare a coating material for forming the catalyst layer, it is possible to reduce the amount of the solvent used, and to reduce the burden to the environment.

Preferably, the catalyst electrode based on the present invention has a weight ratio of the catalytic substance and an areal density of the catalytic substance which are specified in the above-mentioned respective ranges, and satisfies the relationship:

$$0.05 \text{ wt\%} \cdot g/m^2 \leq (X/Y) \leq 03 \text{ wt\%} \cdot g/m^2,$$

where X % is the weight ratio of the solid polymer electrolyte to the mixture of the solid polymer electrolyte and the catalyst powder, and Y $m^2/g$ is the specific surface area of the catalyst powder.

In the present invention, the specific surface areas of the catalytic substance, the conductive powder and the like are determined by the gas adsorption method, in which $N_2$ gas, CO gas or the like is used.

Here, where the X/Y is less than 0.05 wt %·g/m$^2$, there are few contact points between the solid polymer electrolyte and the catalyst, i.e., the reaction area is small, and, therefore, a desirable output current may not be obtained. On the other hand, where the X/Y exceeds 0.3 wt %·g/m$^2$, the solid polymer electrolyte is so dense that the reaction efficiency is liable to be lowered and the output characteristic is liable to be lowered.

By specifying the value of X/Y in the above-mentioned range, it is possible to enlarge effectively and easily the effective reaction area in the electrode and to further enhance the output characteristic.

Besides, in formation of the catalyst electrode based on the present invention, when the catalyst powder based on the present invention is bound with the above-mentioned solid polymer electrolyte to form the catalyst layer, the catalyst powder can be held on the above-mentioned current collector with a sufficient strength.

In the present invention, it is preferable to use a carbon powder as the conductive powder, and the specific surface area of the carbon powder is preferably in the range of 250 to 1300 m$^2$/g. Here, when the specific surface area of the carbon powder is less than 250 m$^2$/g or more than 1300 m$^2$/g, the characteristics of the catalyst powder are liable to be lowered, and it may be impossible to obtain enhanced output characteristic.

In addition, the catalyst is preferably at least one noble metal which shows electronic conductivity, for example, at least one noble metal selected from the group consisting of platinum, iridium, palladium, rhodium, gold, and ruthenium, or a mixture thereof.

Furthermore, as the solid polymer electrolyte, for example, Nafion (registered trademark) (a perfluorosulfonic acid resin produced by Du Pont) or the like can be used.

The method for manufacturing the catalyst electrode based on the present invention is not particularly limited. For example, the catalyst electrode can be produced by mixing the catalyst powder based on the present invention and the solid polymer electrolyte with other arbitrary materials to prepare a coating material for forming the catalyst layer, applying the coating material to the current collector, and drying the applied coating material.

The catalyst electrode based on the present invention can be applied to an electrochemical device based on the present invention, which may be constituted as a fuel cell, for example.

Namely, the electrochemical device based on the present invention includes a plurality of electrodes, and an ionic conductor sandwiched between the electrodes, wherein the catalyst electrode based on the present invention constitutes at least one of the plurality of electrodes.

For example, in a basic structure including a first electrode, a second electrode, and an ionic conductor sandwiched between the electrodes, the catalyst electrode based on the present invention can be applied to at least the first electrode of the first and second electrodes.

To be more specific, the catalyst electrode based on the present invention can be applied preferably to, for example, an electrochemical device in which at least one of a first electrode and a second electrode is a gas electrode.

Figure 3:
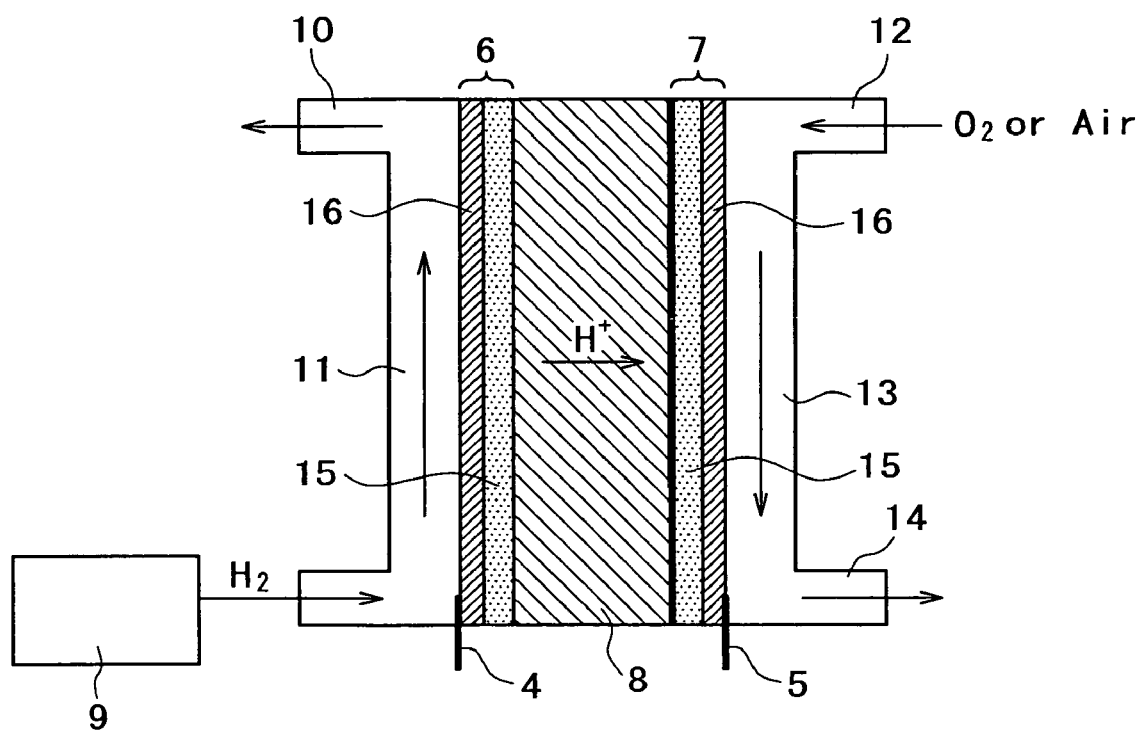
FIG. 3 is a schematic sectional view of an electrochemical device based on the present invention.

FIG. 3 shows a specific example of a fuel cell in which catalyst electrode based on the present invention is used.

Here, each catalyst layer 15 in FIG. 3 includes a catalyst powder based on the present invention, which includes the catalyst as the catalytic substance supported on the surfaces of a conductive powder (for example, a carbon powder), and the solid polymer electrolyte, wherein the weight ratio of the catalyst is in the range of 55 to 75 wt %, and the areal density of the catalyst is in the range of 1 to 3 mg/cm$^2$. The catalyst electrode based on the present invention is a porous gas-diffusive catalyst electrode comprised of the catalyst layer 15 and a porous gas-diffusive current collector, for example, carbon sheet 16. It should be noted here that the catalyst layer 15 alone may be referred to as the gas-diffusible catalyst electrode. In addition, an ionic conductor 8 is clamped between a first electrode and a second electrode which are constituted by use of the catalyst electrodes based on the present invention.

The fuel cell includes a negative electrode (fuel electrode or hydrogen electrode) 6, which is constituted by use of the catalyst electrode based on the present invention (which may not necessarily be used for the negative electrode) and to which a terminal 4 is attached, a positive electrode (oxygen electrode) 7, which is constituted by use of the catalyst electrode based on the present invention and to which a terminal 5 is attached, the negative and positive electrodes being opposed to each other, and the ionic conductor 8 is sandwiched between the negative and positive electrodes 6, 7.

In use of the fuel cell, hydrogen gas is caused to flow through an $H_2$ passage 11 on the side of the negative electrode 6. While passing through the passage 11, the fuel ($H_2$) diffuses into the negative electrode 6, to generate protons ($H^+$) on the catalyst in the negative electrode 6, and the protons thus generated pass through the ionic conductor 8 to the side of the positive electrode 7, where they react with oxygen (air), which has passed through an $O_2$ passage 13 and diffused into the positive electrode 7, on the catalyst in the positive electrode 7, whereby a desired electromotive force is taken out.

In the fuel cell as above, the catalyst electrodes based on the present invention constitute the first electrode and the second electrode, the weight ratio of the catalyst as the catalytic substance is in the range of 55 to 75 wt %, and the areal density of the catalyst is specified to be in the range of 1 to 3 mg/cm$^2$; therefore, it is possible to enlarge effectively and easily the effective reaction area of the catalyst in the electrodes and to enhance the output characteristic.

In addition, since the two conditions as to the weight ratio of the catalyst and the areal density of the catalyst are simultaneously satisfied, it is possible to enlarge the areal density of the catalyst without, for example, enlarging the thickness of the catalyst layers 15. This is because the specific surface area of the catalyst powder based on the present invention is smaller than that in the related art, and this makes it possible to reduce the amount of the solid polymer electrolyte, which functions also as a binder. Therefore, it is possible to lower the internal resistance of the electrodes, and to restrain the voltage drop arising from the internal resistance, so that it is possible to increase the output of the electrochemical device.

Furthermore, since the weight ratio of the catalyst is specified to be in the above-mentioned range, the specific surface area of the catalyst powder is smaller than that in the related art. Therefore, for example, when the catalyst powder based on the present invention is dispersed in a solvent to prepare a coating material for forming the catalyst layers 15, it is possible to reduce the amount of the solvent used, and to reduce the burden to the environment.

Besides, while an example of supplying hydrogen gas as a fuel on the side of the negative electrode 6 has been described above, it is preferable to use a liquid fuel such as methanol and ethanol in place of the hydrogen gas, in the case where a perfluorosulfonic acid resin or the like which is effective in the presence of water is used as the solid electrolyte and/or the ionic conductor.

EXAMPLES

Now, the present invention will be described more in detail below, based on the examples.

Example 1

To 10 parts by weight of a catalyst powder (specific surface area: 130 $m^2/g$) including platinum supported on the surfaces of Ketjenblack EC (a product by Ketjenblack International Corporation; specific surface area: 800 $m^2/g$; the same applies hereinafter) in a weight ratio of 65 wt %, 10 parts by weight of pure water was added, and, after wetting well, 30 parts by weight of 1-propanol and 60 parts by weight of a 5% Nafion (registered trademark; a product by Du Pont) solution were added to the admixture, followed by mixing the resultant admixture sufficiently. The coating material thus obtained was applied to a gas-permeable current collector having been treated to be water-repellent, and was dried, to obtain an oxygen electrode (cathode) having a platinum areal density of 2 $mg/cm^2$.

Besides, to 10 parts by weight of a catalyst powder (specific surface area: 230 $m^2/g$) including a platinum-ruthenium alloy supported on the surfaces of Ketjenblack EC in a weight ratio of 60 wt %, 20 parts by weight of pure water was added, and, after wetting well, 20 parts by weight of 1-propanol and 100 parts by weight of a 5% Nafion solution were added to the admixture, followed by mixing the resultant admixture sufficiently. The coating material thus obtained was applied to a gas-permeable current collector having been treated to be water-repellent, and was dried, to obtain a fuel electrode (anode) having a platinum-ruthenium alloy areal density of 2 $mg/cm^2$.

A Nafion (registered trademark) film (a product by Du Pont) was clamped between the electrodes produced as above, then the members were joined to each other to produce an MEA (Membrane & Electro Assembly, or an electrode-electrolyte assembly), and an electrochemical device constituted as a fuel cell as shown in FIG. 3 was obtained.

Example 2

An MEA was produced and an electrochemical device was obtained in the same manner as in Example 1, except that 10 parts by weight of pure water was added to 10 parts by weight of a catalyst powder (specific surface area: 200 $m^2/g$) including platinum supported on the surfaces of Ketjenblack EC in a weight ratio of 55 wt %, then, after wetting well, 20 parts by weight of 1-propanol and 90 parts by weight of a 5% Nafion solution were added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 2 $mg/cm^2$.

Example 3

An MEA was produced and an electrochemical device was obtained in the same manner as in Example 1, except that 10 parts by weight of pure water was added to 10 parts by weight of a catalyst powder (specific surface area: 100 $m^2/g$) including platinum supported on the surfaces of Ketjenblack EC in a weight ratio of 75 wt %, then, after wetting well, 10 parts by weight of 1-propanol and 40 parts by weight of a 5% Nafion solution were added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 2 $mg/cm^2$.

Example 4

An MEA was produced and an electrochemical device was obtained in the same manner as in Example 1, except that 20 parts by weight of pure water was added to 10 parts by weight of a catalyst powder (specific surface area: 130 $m^2/g$) including platinum supported on the surfaces of Ketjenblack EC in a weight ratio of 65 wt %, then, after wetting well, 70 parts by weight of 1-propanol and 20 parts by weight of a 5% Nafion solution were added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 2 $mg/cm^2$.

Example 5

An MEA was produced and an electrochemical device was obtained in the same manner as in Example 1, except that 20 parts by weight of pure water was added to 10 parts by weight of a catalyst powder (specific surface area: 130 $m^2/g$) including platinum supported on the surfaces of Ketjenblack EC in a weight ratio of 65 wt %, then, after wetting well, 100 parts by weight of a 5% Nafion solution was added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 2 $mg/cm^2$.

Example 6

An MEA was produced and an electrochemical device was obtained in the same manner as in Example 1, except that 10 parts by weight of pure water was added to 10 parts by weight of a catalyst powder (specific surface area: 130 $m^2/g$) including platinum supported on the surfaces of Ketjenblack EC in a weight ratio of 65 wt %, then, after wetting well, 30 parts by weight of 1-propanol and 60 parts by weight of a 5% Nafion solution were added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 1 $mg/cm^2$.

Example 7

An MEA was produced and an electrochemical device was obtained in the same manner as in Example 1, except that 10 parts by weight of pure water was added to 10 parts by weight of a catalyst powder (specific surface area: 130 $m^2/g$) including platinum supported on the surfaces of Ketjenblack EC in a weight ratio of 65 wt %, then, after wetting well, 30 parts by weight of 1-propanol and 60 parts by weight of a 5% Nafion solution were added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 3 mg/cm$^2$.

Example 8

An MEA was produced and an electrochemical device was obtained in the same manner as in Example 1, except that 10 parts by weight of pure water was added to 10 parts by weight of a catalyst powder (specific surface area: 130 m$^2$/g) including platinum supported on the surfaces of Ketjenblack EC in a weight ratio of 65 wt %, then, after wetting well, 160 parts by weight of a 5% Nafion solution was added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 2 mg/cm$^2$.

Example 9

An MEA was produced and an electrochemical device was obtained in the same manner as in Example 1, except that 20 parts by weight of pure water was added to 10 parts by weight of a catalyst powder (specific surface area: 130 m$^2$/g) including platinum supported on the surfaces of Ketjenblack EC in a weight ratio of 65 wt %, then, after wetting well, 10 parts by weight of a 5% Nafion solution was added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 2 mg/cm$^2$.

Example 10

An MEA was produced and an electrochemical device was obtained in the same manner as in Example 1, except that 20 parts by weight of pure water was added to 10 parts by weight of a catalyst powder (specific surface area: 200 m$^2$/g) including a platinum-ruthenium alloy supported on the surfaces of Ketjenblack EC in a weight ratio of 70 wt %, then, after wetting well, 40 parts by weight of 1-propanol and 80 parts by weight of a 5% Nafion solution were added to the admixture, followed by mixing the resultant admixture sufficiently, and the coating material thus obtained was applied to a gas-permeable current collector having been treated to be water-repellent, and was dried, to obtain a fuel electrode (anode) having a platinum-ruthenium alloy areal density of 2 mg/cm$^2$.

Example 11

An MEA was produced and an electrochemical device was obtained in the same manner as in Example 1, except that 20 parts by weight of pure water was added to 10 parts by weight of a catalyst powder (specific surface area: 230 m$^2$/g) including a platinum-ruthenium alloy supported on the surfaces of Ketjenblack EC in a weight ratio of 60 wt %, then, after wetting well, 150 parts by weight of a 5% Nafion solution was added to the admixture, followed by mixing the resultant admixture sufficiently, and the coating material thus obtained was applied to a gas-permeable current collector having been treated to be water-repellent, and was dried, to obtain a fuel electrode (anode) having a platinum-ruthenium alloy areal density of 2 mg/cm$^2$.

Example 12

An MEA was produced and an electrochemical device was obtained in the same manner as in Example 1, except that 20 parts by weight of pure water was added to 10 parts by weight of a catalyst powder (specific surface area: 280 m$^2$/g) including a platinum-ruthenium alloy supported on the surfaces of Ketjenblack EC in a weight ratio of 45 wt %, then, after wetting well, 10 parts by weight of 1-propanol and 120 parts by weight of a 5% Nafion solution were added to the admixture, followed by mixing the resultant admixture sufficiently, and the coating material thus obtained was applied to a gas-permeable current collector having been treated to be water-repellent, and was dried, to obtain a fuel electrode (anode) having a platinum-ruthenium alloy areal density of 2 mg/cm$^2$.

Example 13

An MEA was produced and an electrochemical device was obtained in the same manner as in Example 1, except that 20 parts by weight of pure water was added to 10 parts by weight of a catalyst powder (specific surface area: 230 m$^2$/g) including a platinum-ruthenium alloy supported on the surfaces of Ketjenblack EC in a weight ratio of 60 wt %, then, after wetting well, 10 parts by weight of 1-propanol and 20 parts by weight of a 5% Nafion solution were added to the admixture, followed by mixing the resultant admixture sufficiently, and the coating material thus obtained was applied to a gas-permeable current collector having been treated to be water-repellent, and was dried, to obtain a fuel electrode (anode) having a platinum areal density of 2 mg/cm$^2$.

Comparative Example 1

An MEA was produced and an electrochemical device was obtained in the same manner as in Example 1, except that 20 parts by weight of pure water was added to 10 parts by weight of a catalyst powder (specific surface area: 290 m$^2$/g) including platinum supported on the surfaces of Ketjenblack EC in a weight ratio of 45 wt %, then, after wetting well, 40 parts by weight of 1-propanol and 120 parts by weight of a 5% Nafion solution were added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 2 mg/cm$^2$.

Comparative Example 2

An MEA was produced and an electrochemical device was obtained in the same manner as in Example 1, except that 10 parts by weight of pure water was added to 10 parts by weight of a catalyst powder (specific surface area: 85 m$^2$/g) including platinum supported on the surfaces of Ketjenblack EC in a weight ratio of 80 wt %, then, after wetting well, 10 parts by weight of 1-propanol and 30 parts by weight of a 5% Nafion solution were added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 2 mg/cm$^2$.

Comparative Example 3

An MEA was produced and an electrochemical device was obtained in the same manner as in Example 1, except that 10 parts by weight of pure water was added to 10 parts by weight of a catalyst powder (specific surface area: 130 m²/g) including platinum supported on the surfaces of Ketjenblack EC in a weight ratio of 65 wt %, then, after wetting well, 30 parts by weight of 1-propanol and 60 parts by weight of a 5% Nafion solution were added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 0.5 mg/cm².

Comparative Example 4

An MEA was produced and an electrochemical device was obtained in the same manner as in Example 1, except that 10 parts by weight of pure water was added to 10 parts by weight of a catalyst powder (specific surface area: 130 m²/g) including platinum supported on the surfaces of Ketjenblack EC in a weight ratio of 65 wt %, then, after wetting well, 30 parts by weight of 1-propanol and 60 parts by weight of a 5% Nafion solution were added to the admixture, followed by mixing the resultant admixture sufficiently, and the coating material thus obtained was applied to a gas-permeable current collector having been treated to be water-repellent, and was dried, to obtain an oxygen electrode (cathode) having a platinum areal density of 4 mg/cm².

By use of the electrochemical devices produced in Examples 1 to 13 and Comparative Examples 1 to 4 as above-described, the output characteristics of the fuel cells were measured under the conditions of a temperature of 80° C., an aqueous 1 mol/l methanol solution used as a fuel, and a methanol flow rate of 5 cc/min. I-V characteristic was measured under an oxygen or airflow rate of 500 cc/min. Besides, the electric resistance in the sectional direction of each electrode and the thickness of the catalyst layer were measured. The results are shown in Tables 1 to 4 and FIGS. 4 to 6.

TABLE 1

| | | Example 1 | Example 2 | Example 3 | Example 4 | Example 5 |
|---|---|---|---|---|---|---|
| Oxygen electrode | Catalyst supporting ratio (wt %) | 65 | 55 | 75 | 65 | 65 |
| | Catalyst areal density (mg/cm²) | 2 | 2 | 2 | 2 | 2 |
| | Y = Catalyst powder specific surface area (m²/g) | 130 | 200 | 100 | 130 | 130 |
| | B = Catalyst powder (parts by weight) | 10 | 10 | 10 | 10 | 10 |
| | A = Nafion solution (parts by weight) | 3 | 4.5 | 2 | 1 | 5 |
| | X = A/(A + B) × 100 | 23.1 | 31.0 | 16.7 | 9.09 | 33.3 |
| | X/Y | 0.18 | 0.16 | 0.17 | 0.07 | 0.25 |
| Fuel electrode | Catalyst supporting ratio (wt %) | 60 | 60 | 60 | 60 | 60 |
| | Catalyst areal density (mg/cm²) | 2 | 2 | 2 | 2 | 2 |
| | Y = Catalyst powder specific surface area (m²/g) | 230 | 230 | 230 | 230 | 230 |
| | B = Catalyst powder (parts by weight) | 10 | 10 | 10 | 10 | 10 |
| | A = Nafion solution (parts by weight) | 5 | 5 | 5 | 5 | 5 |
| | X = A/(A + B) × 100 | 33.3 | 33.3 | 33.3 | 33.3 | 33.3 |
| | X/Y | 0.14 | 0.14 | 0.14 | 0.14 | 0.14 |
| Maximum output (mW/cm²) | | 150 | 110 | 120 | 125 | 130 |
| Electrode resistance (oxygen electrode) (mΩ) | | 0.35 | 0.30 | 0.42 | 0.32 | 0.44 |
| Thickness (oxygen electrode) (μm) | | 20 | 35 | 15 | 20 | 20 |

TABLE 2

| | | Example 6 | Example 7 | Example 8 | Example 9 |
|---|---|---|---|---|---|
| Oxygen electrode | Catalyst supporting ratio (wt %) | 65 | 65 | 65 | 65 |
| | Catalyst areal density (mg/cm²) | 1 | 3 | 2 | 2 |
| | Y = Catalyst powder specific surface area (m²/g) | 130 | 130 | 130 | 130 |
| | B = Catalyst powder (parts by weight) | 10 | 10 | 10 | 10 |
| | A = Nafion solution (parts by weight) | 3 | 3 | 8 | 0.5 |

TABLE 2-continued

|  |  | Example 6 | Example 7 | Example 8 | Example 9 |
|---|---|---|---|---|---|
|  | $X = A/(A + B) \times 100$ | 23.1 | 23.1 | 44.4 | 4.76 |
|  | $X/Y$ | 0.18 | 0.18 | 0.34 | 0.04 |
| Fuel electrode | Catalyst supporting ratio (wt %) | 60 | 60 | 60 | 60 |
|  | Catalyst areal density (mg/cm$^2$) | 2 | 2 | 2 | 2 |
|  | Y = Catalyst powder specific surface area (m$^2$/g) | 230 | 230 | 230 | 230 |
|  | B = Catalyst powder (parts by weight) | 10 | 10 | 10 | 10 |
|  | A = Nafion solution (parts by weight) | 5 | 5 | 5 | 5 |
|  | $X = A/(A + B) \times 100$ | 33.3 | 33.3 | 33.3 | 33.3 |
|  | $X/Y$ | 0.14 | 0.14 | 0.14 | 0.14 |
| Maximum output (mW/cm$^2$) |  | 110 | 120 | 85 | 80 |
| Electrode resistance (oxygen electrode) (mΩ) |  | 0.31 | 0.39 | 0.50 | 0.29 |
| Thickness (oxygen electrode) (μm) |  | 15 | 40 | 20 | 20 |

TABLE 3

|  |  | Example 10 | Example 11 | Example 12 | Example 13 |
|---|---|---|---|---|---|
| Oxygen electrode | Catalyst supporting ratio (wt %) | 65 | 65 | 65 | 65 |
|  | Catalyst areal density (mg/cm$^2$) | 2 | 2 | 2 | 2 |
|  | Y = Catalyst powder specific surface area (m$^2$/g) | 130 | 130 | 130 | 130 |
|  | B = Catalyst powder (parts by weight) | 10 | 10 | 10 | 10 |
|  | A = Nafion solution (parts by weight) | 3 | 3 | 3 | 3 |
|  | $X = A/(A + B) \times 100$ | 23.1 | 23.1 | 23.1 | 23.1 |
|  | $X/Y$ | 0.18 | 0.18 | 0.18 | 0.18 |
| Fuel electrode | Catalyst supporting ratio (wt %) | 70 | 60 | 45 | 60 |
|  | Catalyst areal density (mg/cm$^2$) | 2 | 2 | 2 | 2 |
|  | Y = Catalyst powder specific surface area (m$^2$/g) | 200 | 230 | 280 | 230 |
|  | B = Catalyst powder (parts by weight) | 10 | 10 | 10 | 10 |
|  | A = Nafion solution (parts by weight) | 4 | 7.5 | 6 | 1 |
|  | $X = A/(A + B) \times 100$ | 28.6 | 42.9 | 37.5 | 9.09 |
|  | $X/Y$ | 0.15 | 0.19 | 0.14 | 0.04 |
| Maximum output (mW/cm$^2$) |  | 145 | 135 | 95 | 85 |
| Electrode resistance (oxygen electrode) (mΩ) |  | 0.35 | 0.35 | 0.35 | 0.35 |
| Thickness (oxygen electrode) (μm) |  | 20 | 20 | 20 | 20 |

TABLE 4

|  |  | Comparative Example 1 | Comparative Example 2 | Comparative Example 3 | Comparative Example 4 |
|---|---|---|---|---|---|
| Oxygen electrode | Catalyst supporting ratio (wt %) | 45 | 80 | 65 | 65 |
|  | Catalyst areal density (mg/cm$^2$) | 2 | 2 | 0.5 | 4 |
|  | Y = Catalyst powder specific surface area (m$^2$/g) | 290 | 85 | 130 | 130 |
|  | B = Catalyst powder (parts by weight) | 10 | 10 | 10 | 10 |

TABLE 4-continued

|  |  | Comparative Example 1 | Comparative Example 2 | Comparative Example 3 | Comparative Example 4 |
|---|---|---|---|---|---|
|  | A = Nafion solution (parts by weight) | 6 | 1.5 | 3 | 3 |
|  | X = A/(A + B) × 100 | 37.5 | 13.0 | 23.1 | 23.1 |
|  | X/Y | 0.13 | 0.15 | 0.18 | 0.18 |
| Fuel electrode | Catalyst supporting ratio (wt %) | 60 | 60 | 60 | 60 |
|  | Catalyst areal density (mg/cm$^2$) | 2 | 2 | 2 | 2 |
|  | Y = Catalyst powder specific surface area (m$^2$/g) | 230 | 230 | 230 | 230 |
|  | B = Catalyst powder (parts by weight) | 10 | 10 | 10 | 10 |
|  | A = Nafion solution (parts by weight) | 5 | 5 | 5 | 5 |
|  | X = A/(A + B) × 100 | 33.3 | 33.3 | 33.3 | 33.3 |
|  | X/Y | 0.14 | 0.14 | 0.14 | 0.14 |
| Maximum output (mW/cm$^2$) |  | 60 | 90 | 70 | 60 |
| Electrode resistance (oxygen electrode) (mΩ) |  | 0.46 | 0.28 | 0.29 | 0.45 |
| Thickness (oxygen electrode) (μm) |  | 50 | 15 | 10 | 50 |

As is clear from Tables 1 to 4 and FIGS. 2 and 4, Examples 1, 2 and 3 had excellent output characteristics, since the gold supporting ratio was in the range of 55 to 75 wt % (preferably 57 to 75 wt %, and more preferably 60 to 70 wt %). On the other hand, Comparative Example 1 gave a large catalyst powder specific surface area and an extremely large catalyst layer thickness, since the platinum supporting ratio was 45 wt %, i.e., which is below 55 wt %. In Comparative Example 1, therefore, the electrode resistance was high and the maximum output was low.

In Comparative Example 2, although the maximum output was as good as 90 mW/cm$^2$, the maximum output of 90 mW/cm$^2$ was obtained with a platinum supporting ratio of 80 wt %, which is much lower in effectiveness, as compared to a maximum output of 120 mW/cm$^2$ obtained with a platinum supporting ratio of 75 wt % according to the present invention. In Comparative Example 2, further, reproducibility of output characteristic was absent.

Figure 5:
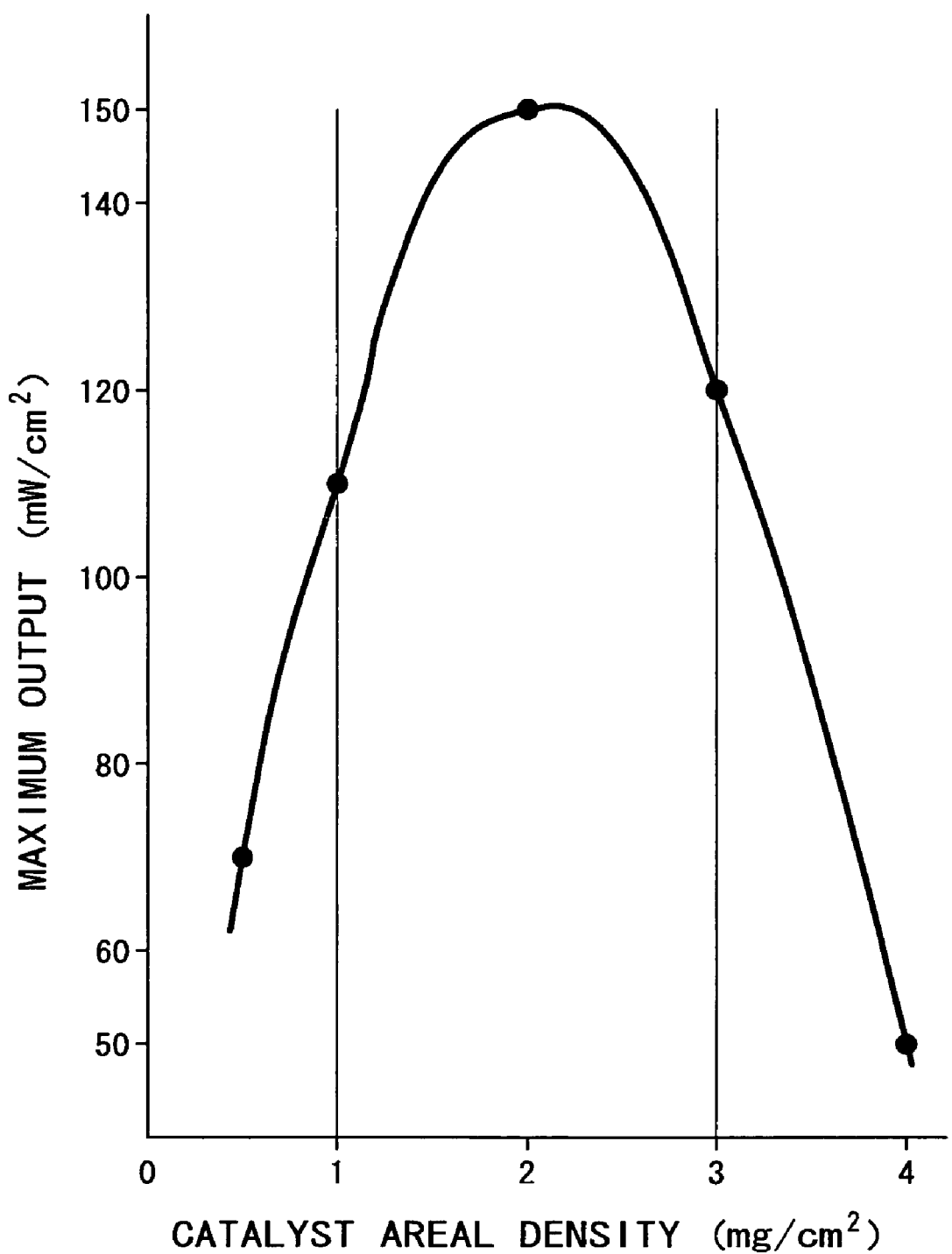
FIG. 5 is a graph showing the relationship between catalyst areal density and maximum output.

In addition, as is clear from Tables 1 and 4 and FIG. 5, Examples 1, 6 and 7 gave excellent output characteristics, since the platinum areal density was in the range of 1 to 3 mg/cm$^2$. On the other hand, Comparative Example 3 had a lowered maximum output, which is considered to be because an effective reaction area could not be obtained, due to the low platinum areal density of 0.5 mg/cm$^2$, i.e., below 1 mg/cm$^2$. Comparative Example 4 gave an excessively large catalyst layer thickness with the result of a high electrode resistance and a lowered maximum output, since the platinum areal density was 4 mg/cm$^2$, which is in excess of 3 mg/cm$^2$.

Besides, according to the present invention, the components were preferably so set as to satisfy the relationship:

0.05 wt %·g/m$^2$ ≦ (X/Y) ≦ 0.3 wt %·g/m$^2$, where X % is the weight ratio of the solid polymer electrolyte to the mixture of the solid polymer electrolyte and the catalyst powder, and Y m$^2$/g is the specific surface area of the catalyst powder. This setting makes it possible to achieve a further enhancement of output characteristic.

Figure 6:
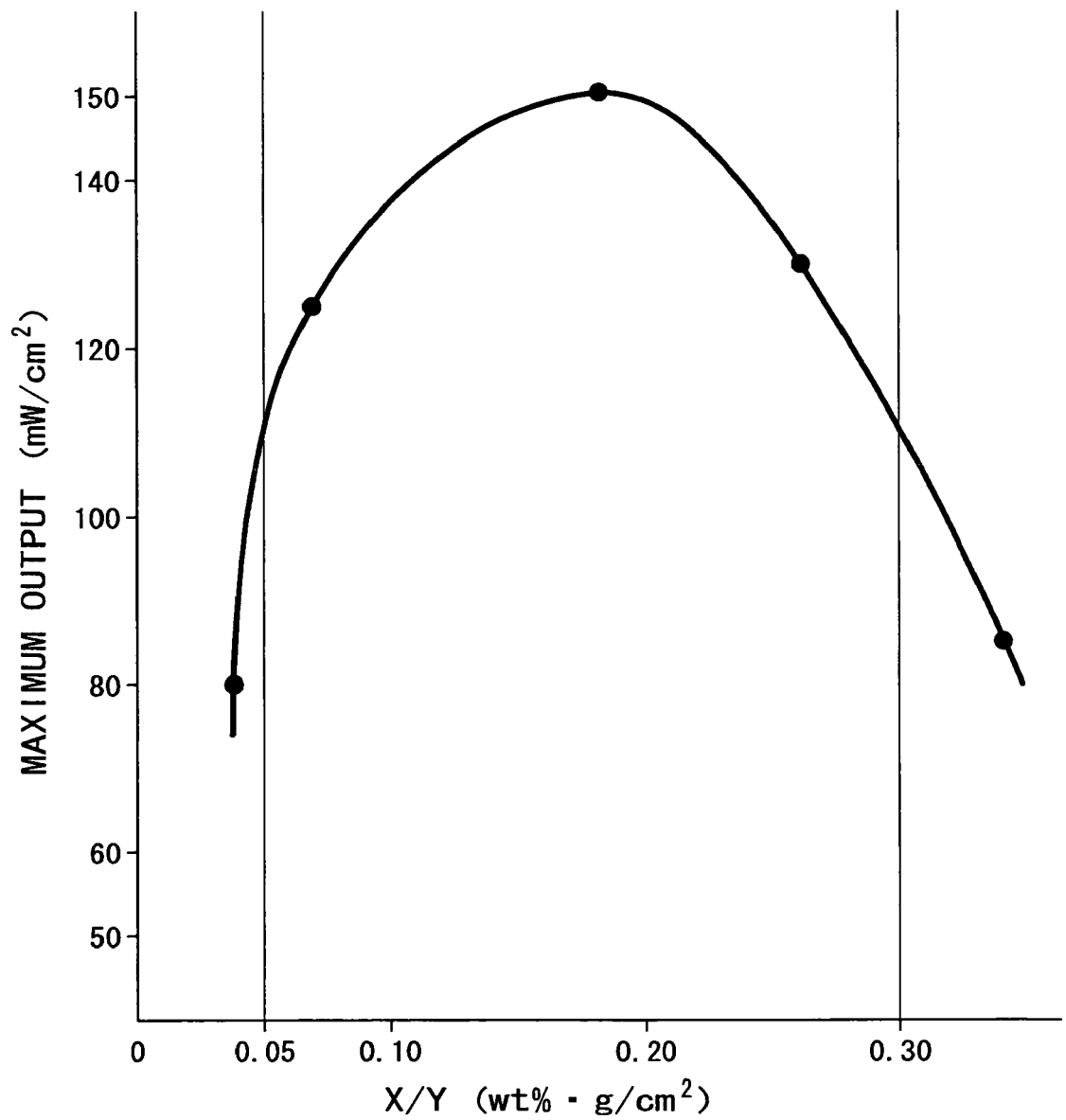
FIG. 6 is a graph showing the relationship between X/Y and maximum output, where X % is the weight ratio of the solid polymer electrolyte to the mixture of the solid polymer electrolyte and the catalyst powder, and Y $m^2/g$ is the specific surface area of the catalyst powder.

Namely, as is clear from Tables 1 to 4 and FIG. 6, although Example 8 could give a good maximum output of 85 mW/cm$^2$, the X/Y value of 0.34 wt %·g/m$^2$ corresponding to a high solid polymer electrolyte ratio made the solid polymer electrolyte excessively dense, leading to a lowered reaction efficiency, a raised electrode resistance, and a lowered output characteristic, as compared to Examples 1, 4 and 5 in which the X/Y value was within the above-mentioned range. Besides, although Example 9 could give a good maximum output of 80 mW/cm$^2$, the X/Y value of 0.04 wt %·g/m$^2$ corresponding to a low solid polymer electrolyte ratio led to a fewer contact points between the solid polymer electrolyte and the catalyst, i.e., a smaller reaction area, which is considered to be the cause of the lowering in output characteristic, as compared to Examples 1, 4 and 5 in which the X/Y value was within the above-mentioned range.

Furthermore, it is important for the electrochemical device according to the present invention that the electrochemical device includes a plurality of electrodes, and an ionic conductor sandwiched between the electrodes, wherein the catalyst electrode based on the present invention constitutes at least one of the plurality of electrodes. While comparisons on the side of the oxygen electrode (cathode) have been described above, similar results were obtained also on the side of the fuel electrode (anode).

Namely, as is clear from Tables 1 to 4, in Example 12 the platinum-ruthenium alloy supporting ratio in the fuel electrode was 45 wt %, i.e., below 55 wt %, which led to a larger catalyst powder specific surface area and a lowered maximum output, as compared to Example 10, for example.

Besides, in Example 13 the X/Y value in the fuel electrode was 0.04 wt %·g/m$^2$, i.e., below 0.05 wt %·g/m$^2$, which is considered to be the cause of a lowering in ionic conductivity and a lowering in maximum output, as compared to Example 11, for example.

Next, the maximum output at the time when the catalyst areal density was varied while fixing the catalyst supporting ratio at 45 wt %, in the oxygen electrode, was measured. In the measurement, the other factors than the catalyst supporting ratio and the catalyst areal density in the oxygen electrode were the same as those in Example 1. The results are shown in Table 5 and FIG. 7.

TABLE 5

|  |  | Comparative Example 5 | Comparative Example 6 | Comparative Example 7 | Comparative Example 8 |
|---|---|---|---|---|---|
| Oxygen electrode | Catalyst supporting ratio (wt %) | 45 | 45 | 45 | 45 |
|  | Catalyst areal density (mg/cm$^2$) | 0.5 | 1 | 1.5 | 2 |
| Maximum output (mW/cm$^2$) |  | 75 | 110 | 85 | 60 |

Besides, the maximum output at the time when the catalyst areal density was varied while fixing the catalyst supporting ratio at 80 wt %, in the oxygen electrode, was measured. In the measurement, the other factors than the catalyst supporting ratio and the catalyst areal density in the oxygen electrode were the same as those in Example 1. The results are shown in Table 6 and FIG. 8.

TABLE 6

|  |  | Comparative Example 9 | Comparative Example 10 | Comparative Example 11 | Comparative Example 12 | Comparative Example 13 | Comparative Example 14 |
|---|---|---|---|---|---|---|---|
| Oxygen electrode | Catalyst supporting ratio (wt %) | 80 | 80 | 80 | 80 | 80 | 80 |
|  | Catalyst areal density (mg/cm$^2$) | 0.5 | 1 | 2 | 3 | 5 | 6 |
| Maximum output (mW/cm$^2$) |  | 40 | 65 | 90 | 115 | 140 | 150 |

Figure 7:
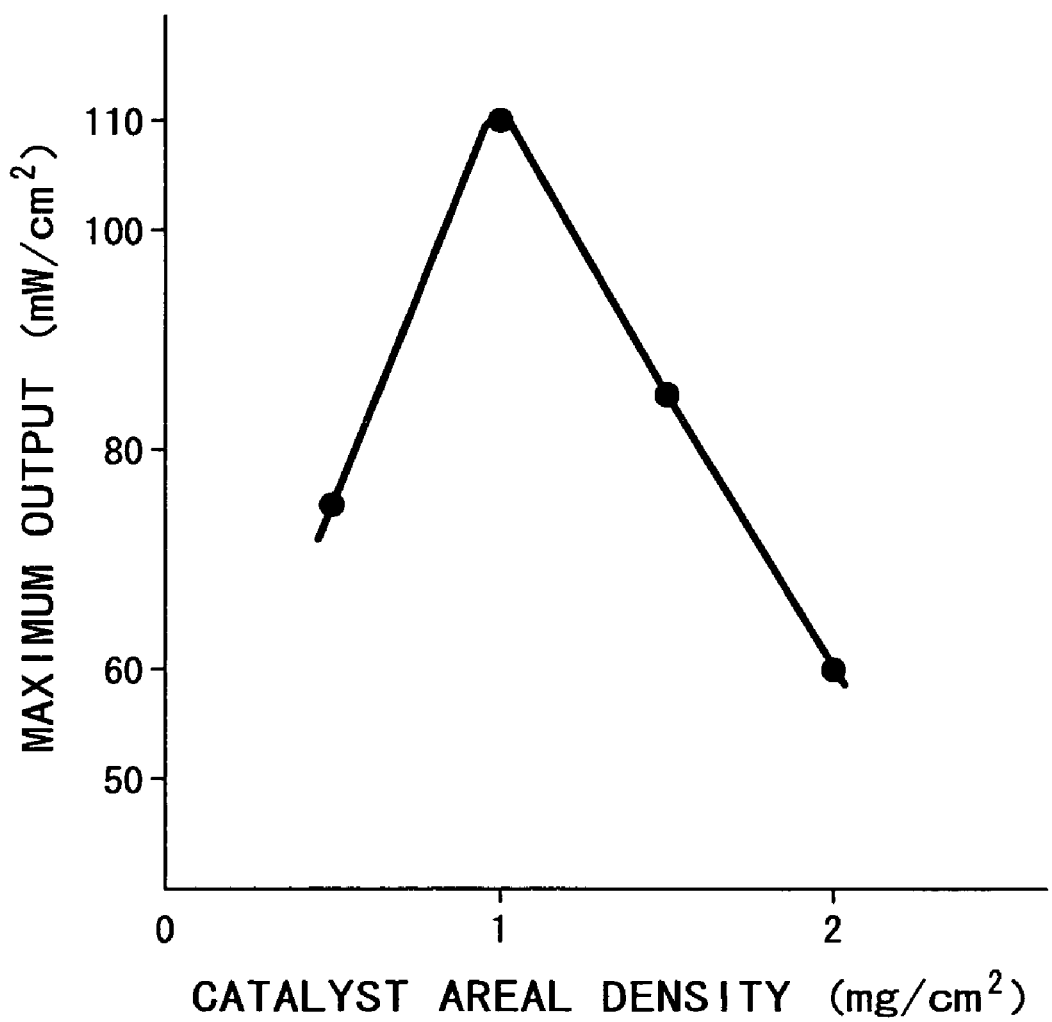
FIG. 7 is a graph showing the relationship between catalyst areal density and maximum output, in the case where the catalyst supporting ratio is less than 55 wt %.

As is clear from Table 5 and FIG. 7, a peak value of maximum output was obtained where the catalyst areal density was in the range of 1 to 3 mg/cm$^2$, but, in this case, since the catalyst supporting ratio was outside the range of 55 to 75 wt %, the values of maximum output were conspicuously lower on the whole, as compared with the case where the catalyst supporting ratio was 65 wt % shown in FIG. 5.

Figure 8:
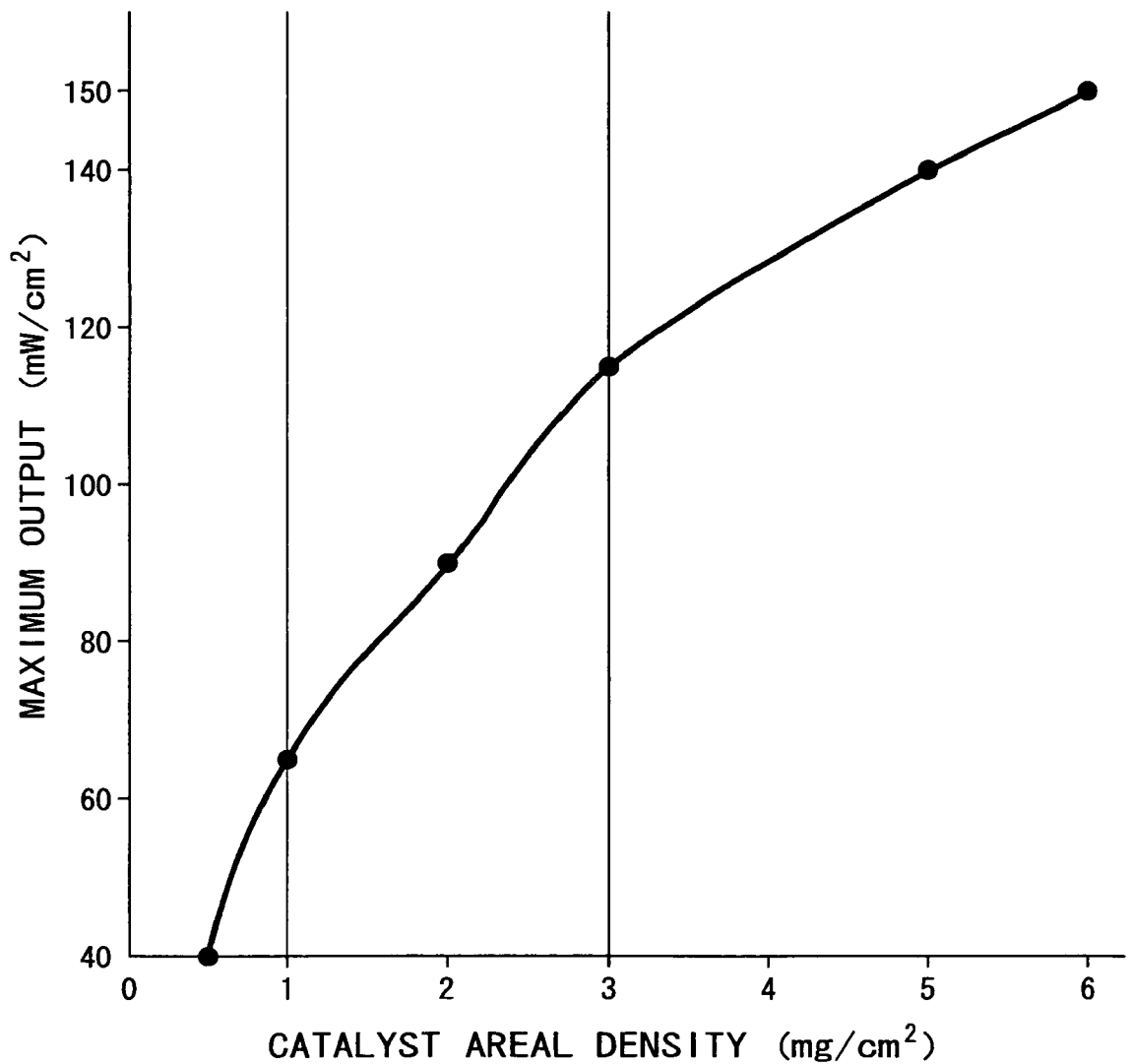
FIG. 8 is a graph showing the relationship between catalyst areal density and maximum output, in the case where the catalyst supporting ratio is more than 75 wt %.

Besides, as is clear from Table 6 and FIG. 8, a peak value of maximum output was obtained where the catalyst areal density is above the range of 1 to 3 mg/cm$^2$, but, in this case, since the catalyst supporting ratio was outside the range of 55 to 75 wt %, the amount of the catalyst (platinum, in this case) used was conspicuously large, which is disadvantageous on a cost basis.

Next, the maximum output at the time when the catalyst supporting ratio was varied while fixing the catalyst areal density at 0.5 mg/cm$^2$, in the oxygen electrode, was measured. In the measurement, the other factors than the catalyst supporting ratio and the catalyst areal density in the oxygen electrode were the same as in Example 1. The results are shown in Table 7 and FIG. 9.

TABLE 7

|  |  | Comparative Example 15 | Comparative Example 16 | Comparative Example 17 | Comparative Example 18 | Comparative Example 19 | Comparative Example 20 |
|---|---|---|---|---|---|---|---|
| Oxygen electrode | Catalyst supporting ratio (wt %) | 45 | 55 | 60 | 65 | 75 | 80 |
|  | Catalyst areal density (mg/cm$^2$) | 0.5 | 0.5 | 0.5 | 0.5 | 0.5 | 0.5 |
| Maximum output (mW/cm$^2$) |  | 75 | 70 | 65 | 60 | 50 | 40 |

Besides, the maximum output at the time when the catalyst supporting ratio was varied while fixing the catalyst areal density at 4 mg/cm², in the oxygen electrode, was measured. In the measurement, the other factors than the catalyst supporting ratio and the catalyst areal density in the oxygen electrode were the same as in Example 1. The results are shown in Table 8 and FIG. 10.

TABLE 8

|  |  | Comparative Example 21 | Comparative Example 22 | Comparative Example 23 | Comparative Example 24 | Comparative Example 25 | Comparative Example 26 |
|---|---|---|---|---|---|---|---|
| Oxygen electrode | Catalyst supporting ratio (wt %) | 45 | 55 | 60 | 65 | 75 | 80 |
|  | Catalyst areal density (mg/cm²) | 4 | 4 | 4 | 4 | 4 | 4 |
| Maximum output (mW/cm²) |  | * | 30 | 45 | 60 | 95 | 125 |

*: The electrochemical device could not be produced.

Figure 9:
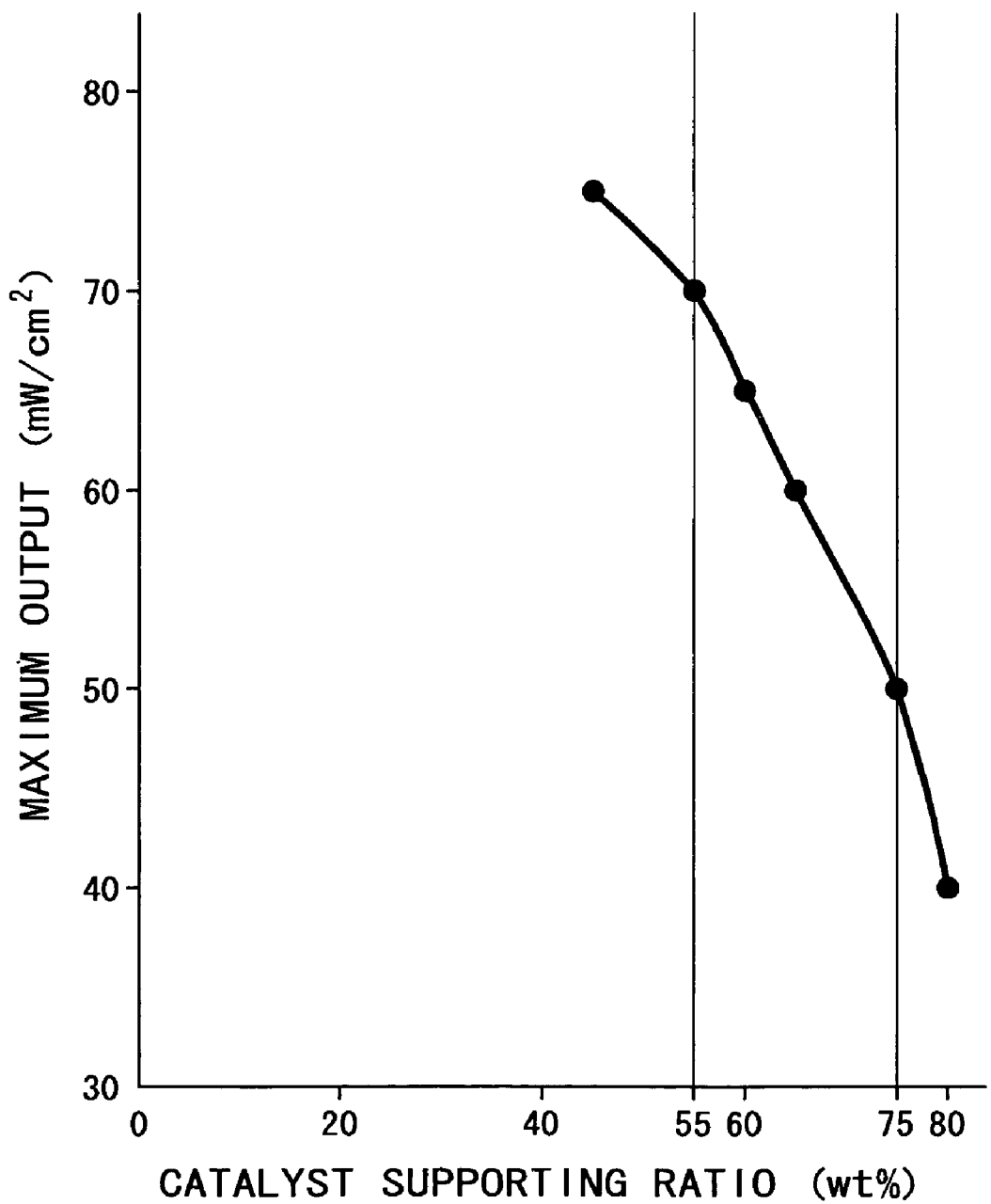
FIG. 9 is a graph showing the relationship between catalyst supporting ratio and maximum output, in the case where the catalyst areal density is less than 1 $mg/cm^2$.

As is clear from Table 7 and FIG. 9, the value of maximum output increased as the catalyst supporting ratio decreased, but, since the catalyst areal density was outside the range of 1 to 3 mg/cm² and the areal density was small, the values of maximum output were conspicuously low on the whole.

Figure 10:
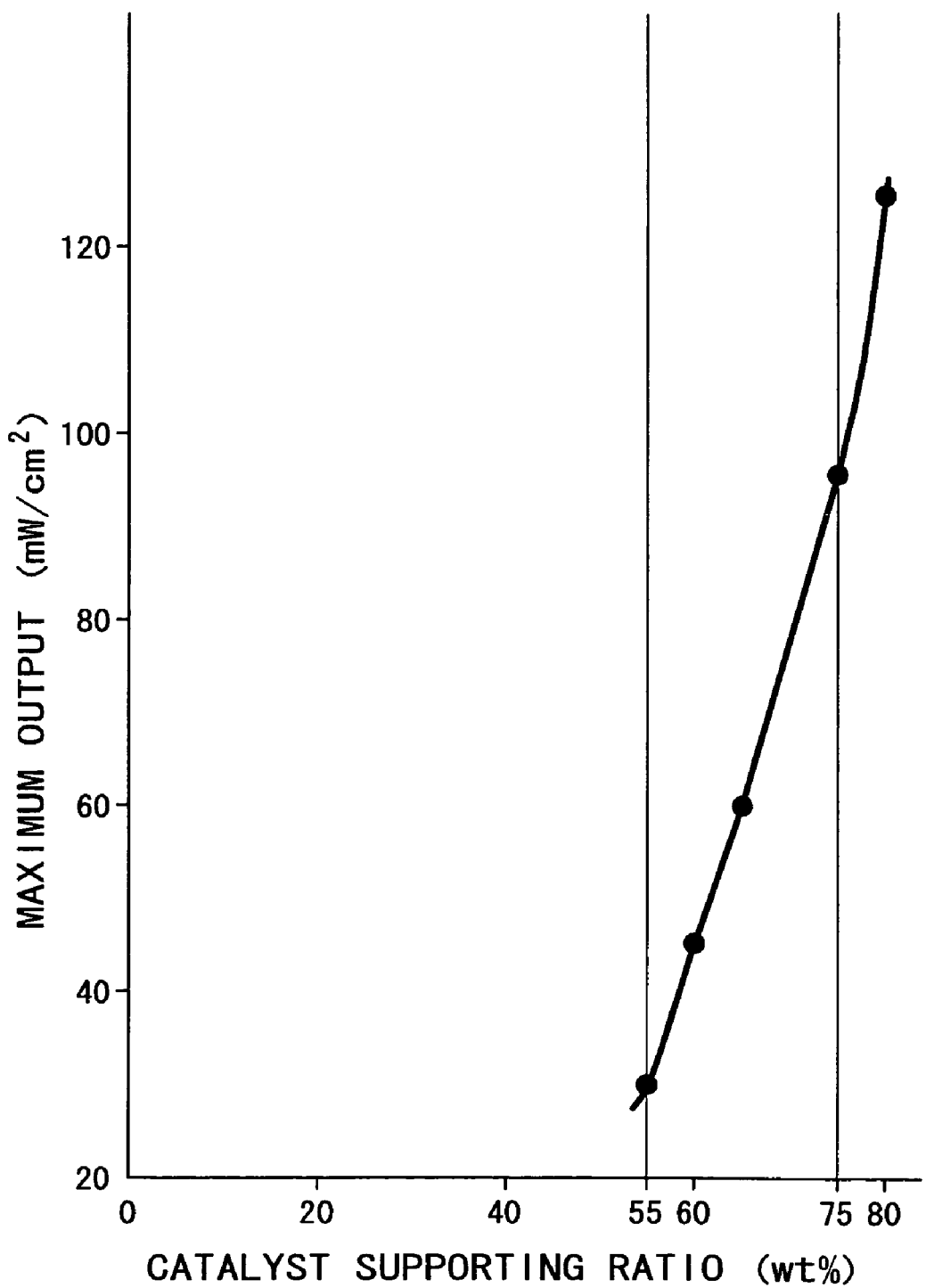
FIG. 10 is a graph showing the relationship between catalyst supporting ratio and maximum output, in the case where the catalyst areal density is more than 3 $mg/cm^2$.

Besides, as is clear from Table 8 and FIG. 10, the value of maximum output increased as the catalyst supporting ratio increased, but, since the catalyst areal density was outside the range of 1 to 3 mg/cm², the values of maximum output were low, and the amount of the catalyst (platinum, in this case) used was conspicuously large, which is disadvantageous on a cost basis. Incidentally, in Comparative Example 21, due to the excessively large thickness of the catalyst layer, many cracks were generated in the layer, making it impossible to produce the electrochemical device.

As is clear from the above description, in the catalyst powder, the catalyst electrode and the electrochemical device based on the present invention, it is important to simultaneously fulfill the two conditions: that the weight ratio of platinum (or a platinum-ruthenium alloy) as the catalytic substance is in the range of 55 to 75 wt %, preferably 57 to 75 wt %, more preferably 60 to 70 wt %, and that the areal density of the catalytic substance is in the range of 1 to 3 mg/cm². This setting makes it possible to enlarge effectively and easily the effective reaction area of the catalyst in the electrode and to obtain an enhanced output characteristic.

In addition, by simultaneously satisfying both the condition as to the weight ratio of the catalytic substance and the condition as to the areal density of the catalytic substance, it is possible to enlarge the areal density of the catalyst without, for example, enlarging the thickness of the catalyst layer. This is because the specific surface area of the catalyst powder based on the present invention is smaller than that in the related art, and this makes it possible to reduce the amount of the solid polymer electrolyte, which functions also as a binder. Therefore, it is possible to lower the internal resistance of the electrode and, hence, to restrain the voltage drop arising from the internal resistance, so that it is possible to increase the output of the electrochemical device.

Furthermore, since the weight ratio of the catalytic substance is specified in the above-mentioned range, the specific surface area of the catalyst powder based on the present invention is smaller than that in the related art. Therefore, for example, when the catalyst powder based on the present invention is dispersed in a solvent to prepare a coating material for forming the catalyst layer, it is possible to reduce the amount of the solvent used, and to reduce the burden to the environment.

The above-described examples can be modified in various ways, based on the technical thought of the present invention.

For example, while platinum (or a platinum-ruthenium alloy) was used in Examples 1 to 5, a noble metal selected from the group consisting of platinum, iridium, palladium, rhodium, gold, and ruthenium, or a mixture thereof can be used as the catalyst in the present invention.

Besides, the above-mentioned catalytic substance may be constituted of the catalyst alone, or may include not only the catalyst but also other substance(s) such as silicon, silicon oxide, etc.

While preferred embodiments of the present invention have been described using specific terms, such description is for illustrative purpose only, and it is to be understood that changes and variations may be made without departing from the spirit or scope of the following claims.

What is claimed is:

1. A catalyst electrode comprising a catalyst powder and a solid polymer electrolyte, said catalyst powder comprising a catalytic substance supported on a conductive powder, said catalytic substance being comprised of at least a catalyst, wherein the weight ratio of said catalytic substance to said catalyst powder is in the range of 55 to 75 wt %, and the areal density of said catalytic substance in said catalyst powder is in the range of 1 to 3 mg/cm²; and wherein the catalyst electrode satisfies the relationship:

$$0.05 \text{ wt } \% \cdot g/m^2 \leq (X/Y) \leq 0.3 \text{ wt } \% \cdot g/m^2$$

where X % is the weight ratio of said solid polymer electrolyte to the mixture of said solid polymer electrolyte and said catalyst powder, and Y m²/g is the specific surface area of said catalyst powder.

2. The catalyst electrode according to claim 1, wherein said conductive powder is a carbon powder, which has a specific surface area in the range of 250 to 1300 m²/g.

3. The catalyst electrode according to claim 1, wherein said catalyst is at least one noble metal.

4. The catalyst electrode according to claim 3, wherein said noble metal is selected from the group consisting of platinum, iridium, palladium, rhodium, gold, and ruthenium.

5. The catalyst electrode according to claim 1, formed in an electrochemical device.

* * * * *